Patented Sept. 29, 1942

2,296,843

UNITED STATES PATENT OFFICE 2,296,843

DYED SUBSTANCE

Béla Gáspár, Hollywood, Calif., assignor to Chromogen, Incorporated, a corporation of Nevada No Drawing. Application March 27, 1940, Serial No. 326,269. In Great Britain April 3, 1939

13 Claims. (Cl. 95—2)

The present invention concerns dyed substances for all purposes where is requisite a dye that is easily bleached by reduction. A particularly important field of employment for dyes of this nature is in photography, where it is frequently necessary to decolorize layers by a simple treatment. For instance, there are known colored filter layers comprising a colloid colored with azo dyes and which may be decolorized with hydrosulphite or other reducing agents. The resistance offered by the various dyes to the action of the bleaching agents is more or less great and therefore most of the known dyes require a comparatively long time for treatment. Processes are known by which the time required for decolorizing by means of hydrosulphite is shortened by the addition of accelerators to the hydrosulphite bath. Furthermore, photographic processes are known in which reducible dyes are locally decolorized in the presence of silver solvents by the metal deposit of a silver image produced in the emulsion layer. In this case also the various dyes show a different resistance and many dyes can only be decolorized under a comparatively long time. It is here also possible to accelerate the bleaching of the dye by the presence of substances acting as catalysts.

The present invention relates to dyed materials in which dyes are used that are very readily bleachable and which are particularly suitable for the above mentioned photographic and color-photographic purposes. According to the invention, the substances that are to be decolorized, particularly the dyed colloid layers of photographic materials, are dyed with azo dyes, the molecule of which comprises a practically colorless component selected from those substances that are capable of acting as accelerators in the reduction of azo dyes. Components of this nature are, for instance, derivatives of phenazine and quinoxaline. Azo dyes containing these compounds as components may, for instance, be produced from diazotized amino-diphenyl-quinoxaline by coupling with N-(p-toluenesulphonyl)-H-acid or from 6-amino-2.3-dimethyl-quinoxaline by coupling with N-(p-toluenesulphonyl)-H-acid. 6-amino-2.3-diphenyl-quinoxaline is described in Liebig's Annalan, vol. 292, page 254, (Hirschberg); Berichte der Deutschen Chemischen Gesellschaft, vol. 37, page 2277, (Bertels); and 6-amino-2.3-dimethyl-quinoxaline is obtainable by heating to about 50 to 60° C. equimolecular amounts of 1.2.4-triaminobenzene and diacetyl in aqueous solution and filtering off the precipitate. The dyes according to the invention may be employed alone for dyeing, but may, however, also be used mixed with other dyes that are but slightly bleachable. In the latter case, the bleachability of the mixture of dyes is considerably greater than in the case of the but slightly bleachable dyes used alone.

*Example 1.*—A gelatin solution, colored with the dye obtained by coupling N-(p-toluenesulphonyl)-H-acid with diazotized amino-alloxazine, is poured as a filter layer on to a silver halide gelatin emulsion layer. Further light-sensitive silver halide layers may be poured on to the filter layer. The filter layer is decolorized by a short immersion in a 1% to 2% solution of sodium hydrosulphite. The dye is produced as follows: 1.5 gms. 7-amino-alloxazine are diazotized at 5° C. in the usual manner and the diazonium salt solution is added to a solution of 2.4 gms. N-(p-toluenesulphonyl)-H-acid rendered alkaline with sodium carbonate. The dye is salted out by the addition of common salt and re-crystallized from ethyl alcohol. The absorption of the dye has its maximum at about 530 $\mu\mu$.

*Example 2.*—The dye mentioned in Example 1 is employed in making a colored emulsion layer comprising a mixture of 2.5 ccs. of silver halide emulsion with 1 cc. of 1% dye solution and 4 ccs. of 4% aqueous solution of gelatin. The colored emulsion is used to form a photographic layer of an area of 100 sq. cm. which is developed and fixed after being exposed. The layer is thoroughly decolorized with sodium hydrosulphite solution.

*Example 3.*—If the object is the production of photographic pictures, the emulsion described in Example 2 may be used, it being, however, practical to precipitate the dye with 1 cc. of 1% anhydro-p-biguanido-benzyl-alcohol acetate. After developing and fixing the exposed material, a treatment with a solution of

| | | |
|---|---|---|
| 2-normal hydrochloric acid | ccs | 250 |
| Water | ccs | 750 |
| Potassium iodide | gms | 2 | yields within less than two minutes a dye image, the areas most intensely exposed being practically completely decolorized.

*Example 4.*—2.5 ccs. of a light-sensitive emulsion, 0.6 cc. of a 1% solution of Tuchechtbrillantrot 2 B (Schultz Farbstofftabellen, Leipzig 1932, vol. 2, 7th ed., page 221), 0.4 cc. of a 1% solution of the dye obtained by coupling N-(p-toluenesulphonyl)-H-acid with diazotized 6-amino-2.3-dimethyl-quinoxaline, 4 ccs. of a 4% aqueous gelatin solution and 0.5 cc. of a 2% solution of anhydro-p-biguanido-benzyl-alcohol acetate are mixed. The colored emulsion is used to form a light-sensitive layer of an area of 100 sq. cm. This is exposed, developed and fixed, afterwards being treated in the bath mentioned in Example 3. After six minutes there will appear a dye image of which the areas most intensely exposed are practically completely decolorized. If, for the preparation of the colored emulsion, only 0.4 cc. of the solution of Tuchechtbrillantrot 2 B are used and the amount of the rapidly bleaching dye is increased by using 0.6 cc. of its 1% solution, a similar picture is obtained already within 4 minutes. On the other hand, if 1 cc. of a 1% solution of Tuchechtbrillantrot 2 B alone is used to dye the emulsion, no picture will be obtained within 20 minutes that shows the intensely exposed areas as completely decolorized as when the mixture of the two dyes is employed. The dye used in this example may be prepared by diazotizing the quinoxaline compound and adding the diazonium salt solution to a solution of the equivalent amount of N-(p-toluene-sulphonyl)-H-acid, rendered alkaline with sodium carbonate. The solution is warmed and a magenta dye is obtained, the absorption of which has a broad maximum between about 520 and 550 $\mu\mu$. In a similar manner, a magenta dye having an absorption maximum at about 520 $\mu\mu$ is obtained from 6-amino-2.3-dimethyl-quinoxaline and N-(p-toluenesulphonyl)-H-acid, whereas a dye of more violet shade is obtained from 2-amino-phenazine.

The colored layers, be they filter or light-sensitive layers, may be used to form a multilayer photographic material comprising a plurality of superposed emulsion layers differently sensitized and arranged on one or both sides of a support, possibly with the interposition of colored or uncolored intermediate layers. In a multilayer material of this kind some of the layers may contain dyes of the usual kind. When the invention is practised in this manner, use may be made of the dyes according to the present invention or of a mixture of the said dyes with dyes that are but slightly bleachable or of a combination of layers dyed with the new dyes and layers that are colorless or dyed with the usual dyes. Thereby, an equalization in the speed of bleaching-out in the various layers of the material can be obtained.

Thus, for example, the dye Chrysophenine G (Schultz Farbstofftabellen, Leipzig 1931, 7th ed., vol. 1, No. 726) is a dye of relatively high bleaching speed, whereas the dye Chlorantinlichtgelb 5 GLL (Schultz Farbstofftabellen, Leipzig 1934, 7th ed., suppl. vol. I, page 79) is a dye of lower bleaching speed. In case the Chrysophenine is used for coloring the yellow silver halide emulsion layer, the magenta layer is dyed with a mixture of the dyes used in Example 4, and with a relatively higher content of quinoxaline dye than is used if the yellow layer is dyed with Chlorantinlitchtgelb.

What is claimed is:

1. A light-sensitive silver halide photographic material comprising a colloid layer, said layer being dyed with an azo dye, the molecule of which contains at least two aromatic radicals linked by an azo group, one of said radicals being substituted by a group which is reducible by a reducing agent and which is reoxidizable to the original group and which serves as a reduction catalyst for the reduction of said azo dye 2. A photographic material comprising a colloid layer, said layer being dyed within an azo dye, the molecule of which contains at least two aromatic radicals linked by an azo group, one of said radicals being that of a practically colorless reduction catalyst, selected from the group which consists of phenazine, fluinoxaline and alloxazine compounds.

3. A photographic material comprising a silver halide emulsion layer, said layer being dyed with an azo dye, the molecule of which contains at least two aromatic radicals linked by an azo group, one of said radicals being substituted by a group which is reducible by a reducing agent and which is reoxidizable to the original group and which serves as a reduction catalyst for the reduction of said azo dye.

4. A photographic material comprising a silver halide emulsion layer, said layer being dyed with an azo dye, the molecule of which contains at least two aromatic radicals linked by an azo group, one of said radicals being that of a practically colorless reduction catalyst, selected from the group which consists of phenazine, quinoxaline and alloxazine compounds.

5. A light-sensitive silver halide photographic multilayer material comprising a plurality of colloid layers in superposition on a single support, one of said layers being dyed with an azo dye, the molecule of which contains at least two aromatic radicals linked by an azo group, one of said radicals being substituted by a group which is reducible by a reducing agent and which is reoxidizable to the original group and which serves as a reduction catalyst for the reduction of said azo dye.

6. A photographic multilayer material comprising a plurality of silver halide emulsion layers in superposition on a single support, one of said layers being dyed with an azo dye, the molecule of which contains at least two aromatic radicals linked by an azo group, one of said radicals being substituted by a group which is reducible by a reducing agent and which is reoxidizable to the original group and which serves as a reduction catalyst for the reduction of said azo dye.

7. A photographic material comprising a silver halide emulsion layer on a support, said layer being dyed with a mixture of a reducible azo dye having a low bleaching speed and an azo dye, the molecule of which contains at least two aromatic radicals linked by an azo group, one of said radicals being that of a reduction catalyst, selected from the group which consists of phenazine, quinoxaline and alloxazine compounds.

8. A light-sensitive silver halide photographic multilayer material comprising a plurality of colloid layers in superposition on a single support, said layers being differently colored with reducible azo dyes, the dye in one of said layers being of relatively high bleaching speed with respect to a dye present in one of the other layers, said last mentioned layer further comprising a bleaching speed modifying azo dye, the molecule of which contains at least two aromatic radicals linked by an azo group, one of said radicals being that of a reduction catalyst, the mixture of the two dyes and the dye within said other layer having substantially balanced bleaching speed.

9. A light-sensitive silver halide photographic material comprising a colloid layer, said layer being dyed with an azo dye forming practically colorless reduction products, one of the reduction products of said azo dye containing a substituent capable of serving as a reduction catalyst during the reduction of said azo dye.

10. A photographic material comprising a silver halide emulsion layer, said layer being dyed with an azo dye forming practically colorless reduction products, one of the reduction products of said azo dye containing a substituent capable of serving as a reduction catalyst during the reduction of said azo dye.

11. A photographic material comprising a colloid layer, said layer being dyed with an azo dye, the molecule of which contains at least two aromatic radicals linked by an azo group, one of said radicals comprising a phenazine compound.

12. A photographic material comprising a colloid layer, said layer being dyed with an azo dye, the molecule of which contains at least two aromatic radicals linked by an azo group, one of said radicals comprising a quinoxaline compound.

13. A photographic material comprising a colloid layer, said layer being dyed with an azo dye, the molecule of which contains at least two aromatic radicals linked by an azo group, one of said radicals comprising an alloxazine compound.

BÉLA GÁSPÁR.